April 4, 1961    A. WALLER ET AL    2,978,078
HANGING ASSEMBLY AND ELEMENTS FOR USE IN SAME
Filed July 26, 1955    2 Sheets-Sheet 1

INVENTOR.
ARTHUR WALLER
OTTO ISENSEE, JR.
BY
Ooms, McDougall, Williams
& Hersh  Attorneys April 4, 1961   A. WALLER ET AL   2,978,078
HANGING ASSEMBLY AND ELEMENTS FOR USE IN SAME
Filed July 26, 1955   2 Sheets-Sheet 2

INVENTOR.
ARTHUR WALLER
OTTO ISENSEE, JR.
BY Ooms, McDougall, Williams & Hersh
Attorneys United States Patent Office 2,978,078
Patented Apr. 4, 1961

2,978,078

HANGING ASSEMBLY AND ELEMENTS FOR USE IN SAME

Arthur Waller, Highland Park, and Otto Isensee, Jr., Glenview, Ill., assignors to Bull Dog Lock Company, Chicago, Ill., a corporation of Illinois Filed July 26, 1955, Ser. No. 524,533

9 Claims. (Cl. 189—88)

This invention relates to a means for mounting a mirror or the like member onto a backing for support and/or suspension and it relates more particularly to a clip member for use in combination with a backing member in attachment of a mirror, plate glass structure or the like element in the desired assembled relation on the front wall of the backing member.

In the past, various types of hardware have been employed for securing a mirror or the like element onto a backing member which might be formed of metal, wooden board, fibrous laminate or molded fibrous structure wherein openings are ground through the plate glass or mirror for insertion of the hardware therethrough in assembly or wherein clip members are fastened by screws or more often by rivets onto the backing while having a flanged portion extending beyond the edge of the assembly and over the adjacent edge portion of the plate glass for holding the plate glass or mirror onto the backing. These techniques are undesirable because the screws or rivets become loosened and often fall out of the assembly and their use requires considerable labor and skill with the result that assembly is limited to places where such skills are available. Such expenditures of time in skilled labor increase the cost and expense of the finished product and the flexibility in its sale and distribution.

It is an object of this invention to provide a method for easily and efficiently assembling a mirror or the like element firmly in its mounted relation onto a backing at low cost without the use of screws or rivets and with a minimum expenditure of time and labor and it is a related object to produce elements for use in the practice of same.

More specifically, it is an object of this invention to produce a fastening clip for use in easily and quickly assembling a mirror or like structure onto a backing plate and it is a related object to provide a backing plate for use in combination therewith whereby the clips can be easily and quickly located in position of use for deformation in a simple and efficient manner to clamp the mirror or like element onto the backing plate, without the danger of undue pressure on the mirror, with means properly to locate the mirror onto the backing plate for assembly, without the necessity for fastening with screws or rivets, without the necessity of boring openings or the like into the mirror, without the necessity for insulating exposed portions of rivets or screws which might come into contact with the silvering to destroy the mirror, without the necessity for the use of skilled labor, and in which the mirror can subsequently be easily and efficiently removed from the backing plate in its intact condition for re-use, repair or the like.

These and other objects and advantages of this invention will hereinafter appear and for purposes of illustration, but not of limitation, embodiments of the invention are shown in the accompanying drawings in which—

Figure 1:
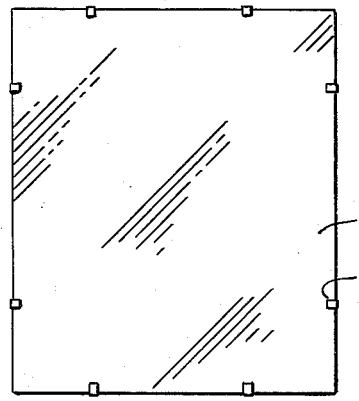
Figure 1 is a front elevational view of an assembly embodying features of this invention.
Figure 2:
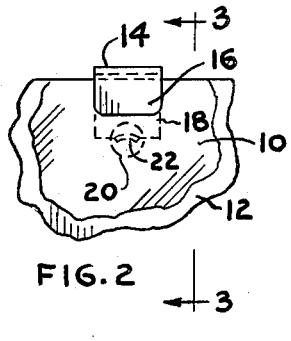
Figure 2 is an enlarged front elevational view of a portion of the assembly shown in Figure 1 with portions broken away to illustrate the arrangement of parts.
Figure 3:
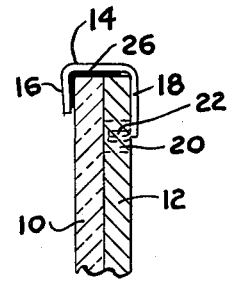
Figure 3 is a sectional view taken along the line 3—3 of Figure 2.

In the drawings, illustration is made of an assembly embodying features of this invention in which a mirror 10 is mounted onto a backing plate 12 of molded fiber board. It will be understood that the mirror 10 is merely representative of elements adapted to be fixed onto a support, such for example as a glass plate, a metal plate, a ceramic plate, a molded plate or the like, and it will be further understood that such plates may or may not have a figure, design or imprint formed or otherwise secured onto the faces thereof or located adjacent the inner face thereof between the plate and the backing. It will be also understood that the backing plate 12 may be formed of other materials such as metal, wooden panels or boards, panels molded of resinous treated papers, bonded fibers or wooden plies, cardboard or the like sheet stock.

In the practice of this invention, use is made of a clip member C formed of a strip of metal having an intermediate portion 14 dimensioned substantially to correspond with the width of the composite members in their assembled relation including the backing plate 12 and the front plate 10. Integral with one edge of the intermediate portion 14 is a front flanged section 16 which extends substantially perpendicularly inwardly from the end of the intermediate portion to lap over the adjacent edge portion of the front face of the front plate, such as the mirror or the like member, when the intermediate portion of the clip is located alongside the lateral edges of the mirror and backing plate when in the assembled relation.

The clip is formed further with a portion 18 turned to extend integrally from the opposite edge of the intermediate section at an angle which is greater than 90 degrees but less than 180 degrees from the intermediate portion. It is preferred to form the portion 18 at an angle between 120–150 degrees with the intermediate portion 14.

Figure 4:
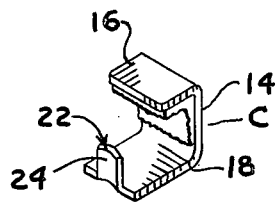
Figure 4 is a perspective view of a clip member in its mounted relation.

The flanged portion 18 is dimensioned to have a length corresponding to the distance between the lateral edge of the backing member 12 and openings 20 provided in the backing member in spaced relation with the edge for receiving means 22 forming a part of the flanged portion for insertion therein to establish an anchoring relation. When, as illustrated in Figure 4 of the drawings, the anchoring member 22 comprises a projection 24 turned inwardly substantially perpendicularly from the outer edge of the flanged extension 18, the latter should be dimensioned to correspond to the spaced relation of the opening 20 from the adjacent edge of the backing 12 to enable the intermediate portion to be disposed adjacent the lateral edge of the assembled mirror 10 and backing plate 12 while the anchoring member 24 is lodged within the opening 20. When the anchoring member comprises a portion downturned from the edge, it is preferred to form the anchoring member curvilinearly, as illustrated in Figure 4, for enabling more substantial engagement between the anchoring member and the edges of the backing plate defining the opening thereby to provide more substantial contact between the surfaces for support. The downturned portion 24 should be dimensioned to have a length which is no greater than the depth of the opening or the thickness of the backing member so as to enable the extension 18 to bear against the back wall of the backing plate, when in the assembled relation, without the end of the downturned portion engaging the mirror or other element supported on the backing member.

Figure 9:
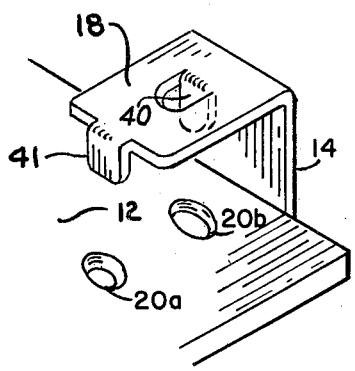
Figure 9 is a perspective view of a portion of a clip member showing a still further modification.
Figure 8:
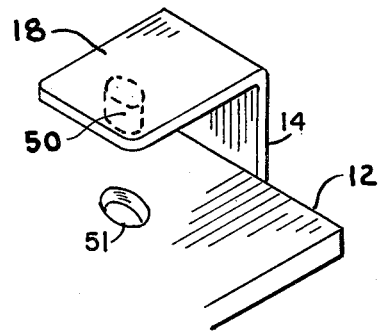
Figure 8 is a perspective view of a portion showing a still further modification in the clip member.
Figure 10:
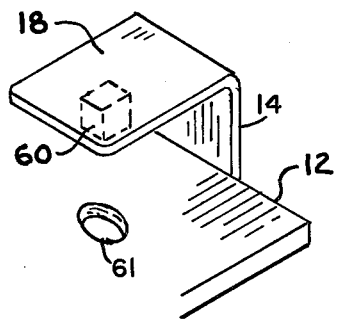
Figure 10 is a view of a clip member similar to Figures 7–9 showing a still further modification thereof.

Instead of making use of a downturned end portion for engagement with the backing plate in the manner described, the extension 18 may be formed with a tongue 30 struck downwardly from a portion thereof spaced from the intermediate section 14 for entrance into the opening 20ᵇ of the backing plate for engagement. When so formed, the extension 18 may be dimensioned to have a length greater than the distance of the opening from the adjacent edge of the backing member, but the effective distance between the intermediate section 14 and the tongue 30 or other fastening means fixed to the extension for entrance in the opening should correspond to the spaced relation between said opening and the adjacent edge. When, as illustrated in Figure 9, the extension 18 is of greater length than the distance between the opening and the adjacent lateral edge of the backing plate, the extension may be formed with a tongue 40 struck downwardly from an intermediate portion thereof for entrance into the opening 20ᵇ and additional means such as a downturned end portion 41 may be provided for entrance into a second opening 20ᵃ spaced inwardly a corresponding distance from the first so as to provide two points for engagement between the clip and the backing plate to militate against relative turning movement or displacement.

For purposes of facilitating assembly, the openings 20 in the backing plate may be preformed in the desired spaced relation corresponding to the desired location of the clips for effecting the assembled relation. For manufacture of backing plates having greater flexibility in assembly and use with different elements wherein the number of clips and location may vary, it is preferred to preform the backing member with openings spaced one from another all about the edge portion in the desired spaced relation from the edge.

Instead of circular openings, it will be understood that the openings in the backing plate may be of other shapes, such as elongate slots 20ᵇ parallel with the adjacent edges of the backing plate and dimensioned to receive the downturned anchoring member such as the tongue 30. Instead, the openings may be triangular, oval, rectangular or square shaped and it will be further understood that the anchoring members, instead of being formed of a tongue such as the tongues 24, 30, 40 and 41, may constitute a portion struck downwardly from the extension such for example as a circular sleeve 50 adapted to be received in a correspondingly dimensioned circular opening 51 in the backing member. The downturned portion may be in the form of a rectangular section 60 or square dimensioned to be received in a corresponding opening 61 in the backing plate more firmly to anchor the clip member thereto.

It is preferred to make use of a cushioning material 26 on the inner wall portion of the clip adapted to engage the lateral side wall portions and the adjacent portion on the front face of the mirror or equivalent element for resilient cushioning engagement between the clip and the mirror when the clip is actuated into the assembled relation. For this purpose, a cushioning strip 26, such as may be formed of a fiber felt, foam rubber, soft rubber, fibrous padding or the like, is secured to the portion of the clip member corresponding to the end flange 16 and at least the adjacent edge portion of the intermediate section 14. When such resilient padding is used, the length of the intermediate section and the distance between the flanged member 16 and the extension 18 may be correspondingly increased but preferably by an amount slightly less than the thickness of the padding so that the padding will be under slight compression in the assembled relation for resilient engagement with the surfaces of the mirror or the like member.

In assembly, it is only necessary roughly to locate the mirror or equivalent member onto the backing plate, insert the anchoring means 22 in a suitable opening 20 in the backing plate with the extension 18 lying flat against the back wall of the backing plate. Then, as the intermediate portion of the clip is bent inwardly about its lower edge to a point where the intermediate section 14 extends substantially perpendicularly from the extension, the flanged end 16 is displaced forwardly and down onto the face of the mirror 10 adjacent the edge portion thereof while the intermediate portion moves laterally into engagement with the side walls. In the event that the edge portion of the mirror extends beyond the backing plate, the intermediate section will operate automatically to align the edges as it is displaced inwardly to the desired assembled relation. Thus as a number of clips are applied in spaced apart relation about the assembly, the mirror or the like member will become automatically positioned properly on the backing plate and the mirror or the like members will be fixed in the desired relation to the backing plate upon engagement between the flanged portion 16 and the extension 18. In the assembled relation, the clips will be incapable of displacement outwardly by reason of the engagement between the anchoring member 22 and the wall portion of the opening thereby to effect a desired assembled relation which holds the elements together.

Figure 5:
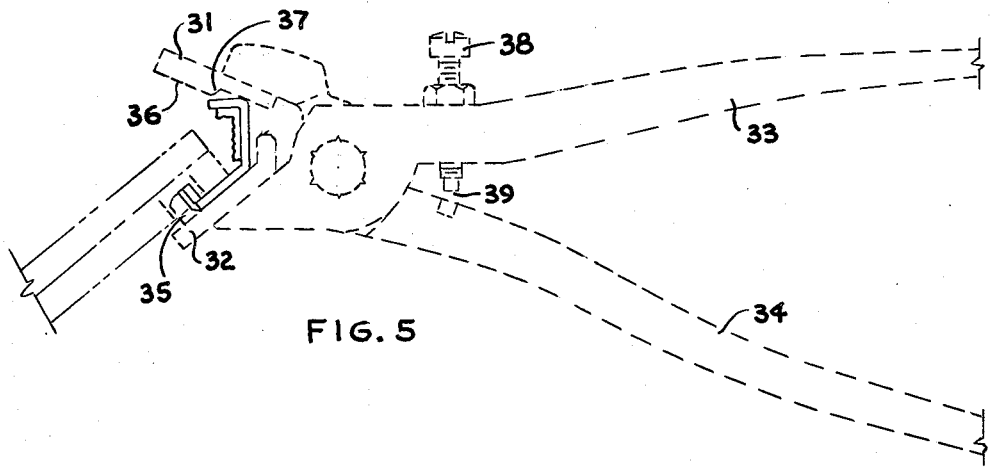
Figure 5 is a schematic elevational view illustrating the arrangement of parts for assembly.
Figure 6:
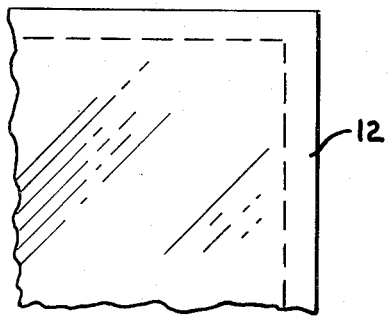
Figure 6 is an elevational view of a fragmentary portion of the backing plate embodying a modification in the practice of this invention.
Figure 7:
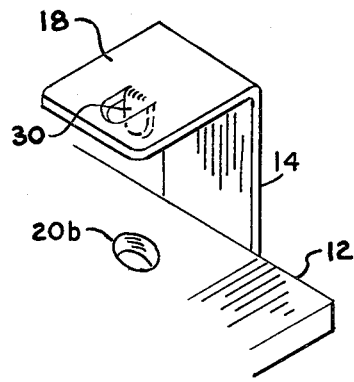
Figure 7 is a perspective view of a portion of a modified form of clip member.

For bending the clips to effect the desired engagement, use can be made of a tool which will apply pressure to the upper edge portion of the intermediate section to bend the section inwardly about its lower edge. Tools of various types may be used. One such tool especially constructed for use in effecting an assembled relation with clips of the type described is illustrated in Figure 5 of the drawings. The tool is similar to a pair of pliers having a pair of jaws 31 and 32 pivoted one on the other with handles 33 and 34 extending beyond the pivot for actuation. One jaw 32 is formed with a stop member 35 extending inwardly substantially perpendicularly from the inner face thereof for receiving the anchoring member 22 in abutting relation while the extension 18 lies flat on the adjacent inner portion of the jaw. The other jaw 31 is formed with a portion 36 projecting outwardly from the inner face thereof to provide a stop shoulder 37 extending substantially perpendicularly from the face of the jaw in a portion aligned with the inner edge of the extension when the intermediate section is bent to extend substantially perpendicularly therefrom.

In use, the clip is prepositioned between the jaws of the tool, as illustrated in Figure 5, with the anchoring member 22 abutting the stop 35 and with the upper end of the intermediate section 14 in engagement with a portion of the jaw 31 spaced inwardly from the shoulder 37. The anchoring member 22 is then inserted in the desired opening 20 of the backing plate 12. By bringing the handle members 33 and 34 together, the upper jaw 31 bears on the end of the intermediate section 14 to bend the section about the lower end until the intermediate section 14 extends substantially perpendicularly from the extension 18. When in this position, the corner between the flanged extension 16 and the intermediate section 14 comes to rest within the stop shoulder 37 which provides sufficient engagement with the flanged section to insure the desired location while preventing distortion of the clip beyond the desired amount which might otherwise cause the application of undesirable pressures onto the mirror to cause breaking or chipping.

The tool may be adjusted for predetermined operation by means of a setscrew 38 operating through an opening in an intermediate portion of one handle for engagement with a stop 39 fixed to the inner wall of the other handle and lying in the path of the end of the screw. By turning the setscrew in one direction or the other, the tool may be caused to stop at a predetermined spaced relation between the jaws or a predetermined angular relation between the jaws. Thus the jaws may be closed to a predetermined amount for use with clips of different dimension or for bending the clips to different angles to effect the desired operation without bending the clip members beyond a predetermined amount.

It will be apparent from the foregoing description that there is provided a simple and efficient means for the location and actuation of clip members into operative engagement with a mirror or equivalent member mounted on the front face of a backing plate for securing the members in the desired alignment one to the other in a manner to prevent relative movements.

It will be understood that changes may be made in the details of construction, arrangement and operation without departing from the spirit of the invention, especially as defined in the following claims.

We claim:

1. For use in assembly of a top plate member onto a supporting backing plate dimensioned to correspond with the top plate and having a plurality of openings in predetermined spaced relation from the adjacent edges thereof about the backing plate, a mounting clip of deformable metallic material having an intermediate portion dimensioned to have a length corresponding to the thickness of the top plate member and the backing plate member when in the assembled relation, a flanged section turned inwardly substantially perpendicularly from one end of the intermediate section for engagement with the front face of the top plate member adjacent the edge portion when in the assembled relation, a flanged member extending inwardly from the other end of the intermediate section at an angle greater than 90 degrees but less than 180 degrees and dimensioned to have a length at least as great as the distance of the opening in the backing plate member from the edge, and an anchoring means on the flanged member spaced from the intermediate section by an amount corresponding to the distance of the openings from the edge of the backing plate.

2. A mounting clip as claimed in claim 1 which includes a resilient strip fixed to the inner walls of the clip in the area corresponding to the flanged section and the portion of the intermediate section adjacent thereto.

3. A mounting clip as claimed in claim 1 in which the flanged member extends from the intermediate section at an angle within the range of 120 to 150 degrees.

4. A mounting clip as claimed in claim 1 in which the anchoring means on the flanged member comprises an inwardly turned end portion extending at an angle of about 90 degrees from the flanged member.

5. A mounting clip as claimed in claim 4 in which the end portion turned inwardly from the flanged member is curvilinear in cross-section.

6. A mounting clip as claimed in claim 1 in which the anchoring means of the flanged member comprises a tongue struck inwardly from an intermediate portion of the flanged member to extend inwardly substantially perpendicularly therefrom.

7. A mounting clip as claimed in claim 1 in which the backing plate member is formed with pairs of openings spaced one from the other inwardly from the edge thereof and in which the anchoring means on the flanged member comprises a pair of depending sections spaced apart longitudinally one from the other and from the intermediate section by an amount corresponding to the spaced relation between the corresponding pairs of openings in the backing plate.

8. A mounting clip as claimed in claim 1 in which the anchoring means comprises a depending member of curvilinear shape struck from the flanged member.

9. A mounting clip as claimed in claim 1 in which the anchoring means comprises a depending member of polygonal shape struck inwardly from the flanged member.

References Cited in the file of this patent

UNITED STATES PATENTS

| | | |
|---|---|---|
| 2,003,856 | Gimbel | June 4, 1935 |
| 2,665,611 | Smith | Jan. 12, 1954 |
| 2,666,364 | Kelly | Jan. 19, 1954 |

FOREIGN PATENTS

| | | |
|---|---|---|
| 696,800 | Great Britain | Sept. 9, 1953 |